(12) United States Patent
Nakashima et al.

(10) Patent No.: US 6,314,505 B1
(45) Date of Patent: Nov. 6, 2001

(54) PROCESSOR AND METHOD FOR ACCESSING RECTANGULAR AREAS IN MEMORY

(75) Inventors: Koji Nakashima; Atsushi Mohri; Akira Yamada, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/208,476

(22) Filed: Dec. 10, 1998

(30) Foreign Application Priority Data

Oct. 13, 1998 (JP) .................................................. 10-290144

(51) Int. Cl.[7] ...................................................... G06F 12/00
(52) U.S. Cl. .............................................................. 711/217
(58) Field of Search .................................... 711/217, 218; 365/239

(56) References Cited

U.S. PATENT DOCUMENTS

| | | | |
|---|---|---|---|
| 3,938,102 | * | 2/1976 | Morrin et al. ...................... 340/172.5 |
| 3,995,253 | * | 11/1976 | Morrin, II et al. ................ 340/146.3 |
| 3,996,559 | * | 12/1976 | Morrin et al. ...................... 340/146.3 |
| 4,090,174 | * | 5/1978 | Van Voorhis ....................... 340/146.3 |
| 4,845,678 | | 7/1989 | van Berkel et al. . |
| 5,363,337 | | 11/1994 | Reinberg . |
| 5,414,666 | * | 5/1995 | Kumagai et al. ..................... 365/222 |
| 5,455,908 | * | 10/1995 | Ishida ..................................... 395/166 |
| 5,504,916 | * | 4/1996 | Murakami et al. .................. 395/800 |

FOREIGN PATENT DOCUMENTS

| | | |
|---|---|---|
| 0135940A2 | 4/1985 | (EP) . |
| 62-293581 | 12/1987 | (JP) . |

* cited by examiner

*Primary Examiner*—Kevin Verbrugge

(57) ABSTRACT

Without making the address control more complex than necessary, a memory can be effectively utilized by accessing a square memory area. According to a processor of the present invention connected to memory apparatus having a two-dimensional memory area comprised of rows and columns, the processor comprises registers for storing a start address, an end address, and a number of columns per row of a square area on the memory. The registers are used to generate access addresses for accessing the square area. The processor is provided with the address generation and control unit for outputting the generated access addresses. The address generation and control unit includes a modulo addressing control unit for generating the access addresses for cyclically accessing the square area. A square circulation mode information decides whether or not to access cyclically the square area. Based on a value of the square circulation mode information, whether or not to cyclically access the square area is decided.

14 Claims, 17 Drawing Sheets

Fig. 3

| CODE:FORMAT | ORDER OF EXECUTION | |
|---|---|---|
| | Operation_0 | Operation_1 |
| FM= 00 : 2 INSTRUCTION | FIRST | FIRST |
| 01 : 2 INSTRUCTION | FIRST | SECOND |
| 10 : 2 INSTRUCTION | SECOND | FIRST |
| 11 : 1 INSTRUCTION | FIRST | ―――― |

Fig. 4

CODE:EXECUTION CONDITION
CC= 000 : NORMAL
     001 : F0=TRUE AND F1=IGNORE
     010 : F0=FALSE AND F1=IGNORE
     011 : F0=IGNORE AND F1=TRUE
     100 : F0=IGNORE AND F1=FALSE
     101 : F0=TRUE AND F1=TRUE
     110 : F0=TRUE AND F1=FALSE
     111 : REGISTRATION COMPLETE

Fig. 5

```
           0       7  9        15      21          27
Short_M    |OPE CODE|X | Ra    | Rb    | SOURCE    |  111
            120    124 121     122     123
Short_A    |OPE CODE|X|0| Ra   | Rb    | SOURCE    |  112
            120    125   121   122     123
Short_B1   |OPE CODE|0|0|  0   |  0    |  Rc       |  113
            120          121   122     126
Short_B2   |OPE CODE|1|0| DISPLACEMENT : 1 8       |  114
            120          
Short_B3   |OPE CODE|Y|Z| Ra   | Rb    | SOURCE    |  115
            120    129 130 121 122     128
Short_D1   |OPE CODE|Y|0| Ra   |       | SOURCE    |  116
            120    129   121           128
Short_D2   |OPE CODE|Y|0| ct:6 |       | SOURCE    |  117
            120    129   131           128
Long 1     |OPE CODE|1|0| Ra   | Rb    | IMMEDIATE VALUE : 3 2 | 53 | 118
            120          121   122     132
Long 2     |OPE CODE|1|Z| Ra   | Rb    | IMMEDIATE VALUE : 3 2 | 53 | 119
            120          121   122     132
```

X=00 => SOURCE = Rc  (123)
X=01 => SOURCE = Rc;Rb++
X=11 => SOURCE = Rc;Rb−−
X=10 => SOURCE = IMMEDIATE VALUE:6

X'=0 => SOURCE = Rc  (123)
X'=1 => SOURCE = IMMEDIATE VALUE:6

Y=0 => SOURCE = Rc  (128)
Y=1 => SOURCE = IMMEDIATE VALUE:12

Z=0 => ZERO TEST
Z=1 => OTHER TESTS

Fig. 7

| | CONTROL REGISTER 150 | |
|---|---|---|
| | 0 | 31 |
| CR0 | P C : PRPG COUNTER | |
| CR1 | P S W : PROCESSOR CONDITION LANGUAGE | |
| CR2 | B P C : BACK UP PROG COUNTER | |
| CR3 | B P S W : BACK UP PROCESSOR CONDITION LANGUAGE | |
| CR4 | RESERVED | |
| CR5 | RESERVED | |
| CR6 | R P T C : REPEAT COUNTER | |
| CR7 | R P T_S : REPEAT START ADDRESS | |
| CR8 | R P T_E : REPEAT END ADDRESS | |
| CR9 | M O D_S : MODULO START ADDRESS | |
| CR10 | M O D E : MODULO END ADDRESS | |
| CR11 | M O D W : MODULO WIDTH | |
| CR12 | I B A : INSTRUCTION BREAK ADDRESS | |
| CR13 | RESERVED | |
| CR14 | RESERVED | |
| CR15 | E I T V B : EIT VECTOR BASE | |
| CR16 | I N T_S : PERIPHERAL CONTROL REGISTER | |
| CR17 | I N T_M : INTERRUPTS VALID REGISTER | |

| 0 | | | | | | | 7 | 8 | | | | | | | 15 | |
|---|---|---|---|---|---|---|---|---|---|---|---|---|---|---|---|---|
| SM | 0 | EA | DB | DS | IE | RP | MD | RMD | 0 | 0 | 0 | 0 | 0 | 0 | 0 | 170 |
| 171 | | 172 | 173 | 174 | 175 | 176 | 177 | 178 | | | | | | | | |
| 16 | | | | | | | 23 | 24 | | | | | | | 31 | |
| 0 | 0 | F1 | 0 | F2 | 0 | F3 | 0 | F4 | 0 | F5 | 0 | F6 | 0 | F7 | 180 |
| 181 | | 182 | | | | | | | | | | | | | | |

SM=0 STACK MODE 0→USE SPU
SM=1 STACK MODE 1→USE SPI
EA=0 UNDETEDT SDBT
EA=1 DETECT SDBT
DB=0 NO PERMIT SDBT
DB=1 PERMIT SDBT

F0 EXECUTION CONTROL FLAG
F1 EXECUTION CONTROL FLAG
F2 GENERAL PURPOSE FLAG
F3 GENERAL PURPOSE FLAG
F4 (S) SATURATE OPERATION FLAG
F5 (V) OVER FLOW FLAG
F6 (VA) ACCUMULATION OVER FLOW FLAG
F7 (C) CARRY/BORROW FLAG

DS=0 DEBAG INTERRUPTS VALID
DS=1 MASK DEBAG INTERRUPTS
IE=0 NO PERMIT INTERRUPTS
IE=1 PERMIT INTERRUPTS
RP=0 REPEAT BLOCK INVALID
RP=1 REPEAT BLOCK VALID
MD=0 MODULO ADDRESSING INVALID
MD=1 MODULO ADDRESSING VALID
RMD=0 SQUARE MODULO ADDRESSING INVALID
RMD=1 SQUARE MODULO ADDRESSING VALID

FIG. 8

PROCESSOR AND METHOD FOR ACCESSING RECTANGULAR AREAS IN MEMORY

BACKGROUND OF THE INVENTION

1. Field of the Invention

The present invention relates to a processor which installs a request master for performing a core function in accessing to a memory, and the processor which installs a memory control unit for controlling the accessing to the memory by arbitrating an access request to the memory by outputting the access request from the request master.

2. Background Arts

FIG. 16 is an extremely simplified diagram of a system comprising the processor and the memory, illustrating a conventional method of how a memory is being used. In the drawing of FIG. 16, a processor 1p is comprised of the following components: a request master 4p which performs a core function of data bus at an inner processor; and a memory control unit 3p for controlling an access to a memory 2 by arbitrating a request from the request master 4p. Also, the request master 4p installs a modulo addressing control unit 6p for cyclically accessing a specified memory area.

A conventional memory access operation for a case of accessing to the memory 2 is described next using FIG. 16. First, the request master 4p outputs a memory access request to the memory 2 situated outside through the memory control unit 3p. Normally, there are a plurality of request masters so that more than one memory access requests are simultaneously requested from the request masters. The memory control unit 3p arbitrates the plurality of memory access requests, chooses one of the requests, and commences accessing to the memory 2 situated outside. As described above, the access to the memory 2 is performed via the memory control unit 3p. The memory control unit 3p performs the memory access by specifying a start address and an end address received from the request master 4p.

In the conventional memory access, since an area on the memory 2 is set by specifying the start address and the end address, therefore, the area set is, for example, has a shape as illustrated in a shadowed area 400 on the memory 2 of FIG. 16. Also, when the modulo addressing control unit 6p operates effectively, in the conventional memory access, the area 400 is accessed a plurality of times, that is, the area 400 is cyclically accessed.

However, for media processors which are receiving much attention recently, such as a digital signal processor (DSP) which is specially geared for a multi-media processing tuned for efficiently performing a voice processing, a modem processing, or a compressed and elongated processing of an image. In DSP, a moving picture such as MPEG2 (Moving Picture Experts Group Phase 2) is commonly being dealt with. When dealing with the moving picture, as illustrated in 304 of FIG. 13, setting a square area in the memory would be convenient. The data of video screen is accessed by using one frame unit of 720×480 picture elements which is required to output the moving picture. Also, access requirement for the compressed and elongated processing is 8×8 block unit. Due to these, setting the square area in the memory is convenient. However, most of the processor cores installed in the media processors have a reduced instruction set computer (RISC) architecture, and there is no architecture available that is provided with an addressing mode for accessing the square area. On the other hand, there is a processor which installs a complexed instruction set computer (CISC) architecture provided with the addressing mode for accessing the square area. Although, a processing ability of the CISC architecture processor is not adequate enough to perform a high performance processing as those of a real time decode processing of MPEG2.

[Problems to be Solved by the Invention]

The conventional area specifying method of the memory accessing which sets the memory area by specifying the start address and the end address has a problem of not being able to specify the square area like the one illustrated in 304 of FIG. 13. Accordingly, the conventional memory accessing method results in an area like the one illustrated in FIG. 17. A hatching is implemented in areas 401, 402, 403 and 404. These areas are separately being used. The area 403 is a reused area which was previously used as an area that attaches to both the areas 402 and 404. The problem with the conventional area specifying method is that the memory cannot be used efficiently from an occurrence of small unused area 405 between the area 403 and the area 404, the occurrence of which depends on a size of the area 403.

Also, when specifying the square area, a plurality of rectangular areas 408 as illustrated in FIG. 18 are considered as one assembled unit of the rectangular areas 408. This leads to a problem of complexity in area control. Because, a start address 406 and an end address 407 are required in order to set each rectangular area. Further, a square area 409 must be taken as the assembled unit comprising the plurality of rectangular areas 408.

The present invention attempts to solve the problem mentioned above, and aims to obtain a processor having a memory control method for using the memory efficiently. Also, the present invention particularly focuses on a processor for accessing the square area of the memory.

SUMMARY OF THE INVENTION

According to one aspect of the present invention, a processor is coupled to a memory unit having a two-dimensional memory having rows and columns. The processor comprises registers for storing access addresses on the memory; and an address generation and control unit for generating and outputting the access addresses for accessing a square area formed by rows and columns on the memory, by using the access addresses stored in the registers.

According to another aspect of the present invention, the processor comprises the registers which include at least a register for storing a start address of the square area, an end address of the square area, and an amount of data per row of the square area. The register includes the address generation and control unit which generates the access addresses for accessing the square area specified by the start address of the square area, the end address of the square area, and the amount of data per row of the square area.

According to another aspect of the present invention, the processor comprises the registers which include at least a register for storing a start address of the square area, an amount of data per row of the square area, and a number of rows of the square area. The address generation and control unit generates the access addresses for accessing the square area specified by the start address of the square area, the amount of data per row of the square area, and the number of rows of the square area.

According to another aspect of the present invention, the processor comprises the address generation and control unit which includes a modulo addressing control unit for generating the access addresses to access the square area cyclically.

According to another aspect of the present invention, the processor comprises the registers which store a square circulation mode information used for deciding whether or not to access the square area cyclically. The modulo addressing control unit decides whether or not to access the square area cyclically by relying on a value of the square circulation mode information.

According to another aspect of the present invention, the address generation and control unit generates a next access address by adding an amount of single data transfer to the start address of the square area, compares a generated access address with an end column address of a currently accessing row which is generated from the amount of data per row of the square area and the start address of the square area, and generates a start address of a next row when the generated access address has exceeded the end column address of the currently accessing row, accesses the square area by adding the amount of single data transfer to the start address of the next row, and by repeatedly further generating the access addresses for generating the next access addresses. The address generation and control unit detects a completion of a square area accessing when the generated access address exceeds the end address of the square area.

According to another aspect of the present invention, the processor comprises the modulo addressing control unit which specifies a next access address to the start address of the square area in case that the value of the square circulation mode information indicates to access the square area cyclically, and in case that the generated access address exceeded the end address of the square area.

According to another aspect of the present invention, the processor comprises the address generation and control unit which generates a next access address by adding the amount of single data transfer to the start address of the square area, compares a generated access address with an end column address of a currently accessing row which is generated from the amount of data per row of the square area and the start address of the square area, and generates a start address of a next row when the generated access address has exceeded the end column address of the currently accessing row. The address generation and control unit accesses the square area by adding the amount of single data transfer to the start address of the next row, and by repeatedly generating the next access addresses, and detects a completion of a square area accessing when the generated access address exceeds the number of rows of the square area.

According to another aspect of the present invention, a memory control method for accessing a memory unit having a two-dimensional memory having rows and columns, the memory control method comprising the following steps of:

storing the access addresses of the memory;

generating and outputting the access addresses for accessing the square area formed by rows and columns on the memory by using the access addresses stored in the storing step; and controlling a memory access request to the access address generated by the generating and controlling step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 3 illustrates is a detail of format fields of FIG. 2;

FIG. 4 illustrates a detail of execution condition field of FIG. 2;

FIG. 5 illustrates a detail of operation fields of FIG. 2;

FIG. 7 illustrates a configuration of control registers inside the register of processors of embodiment 1 of the present invention;

FIG. 8 illustrates a detail of processor condition language illustrated in FIG. 7;

DETAILED DESCRIPTION OF THE PREFERRED EMBODIMENTS

Figure 1:
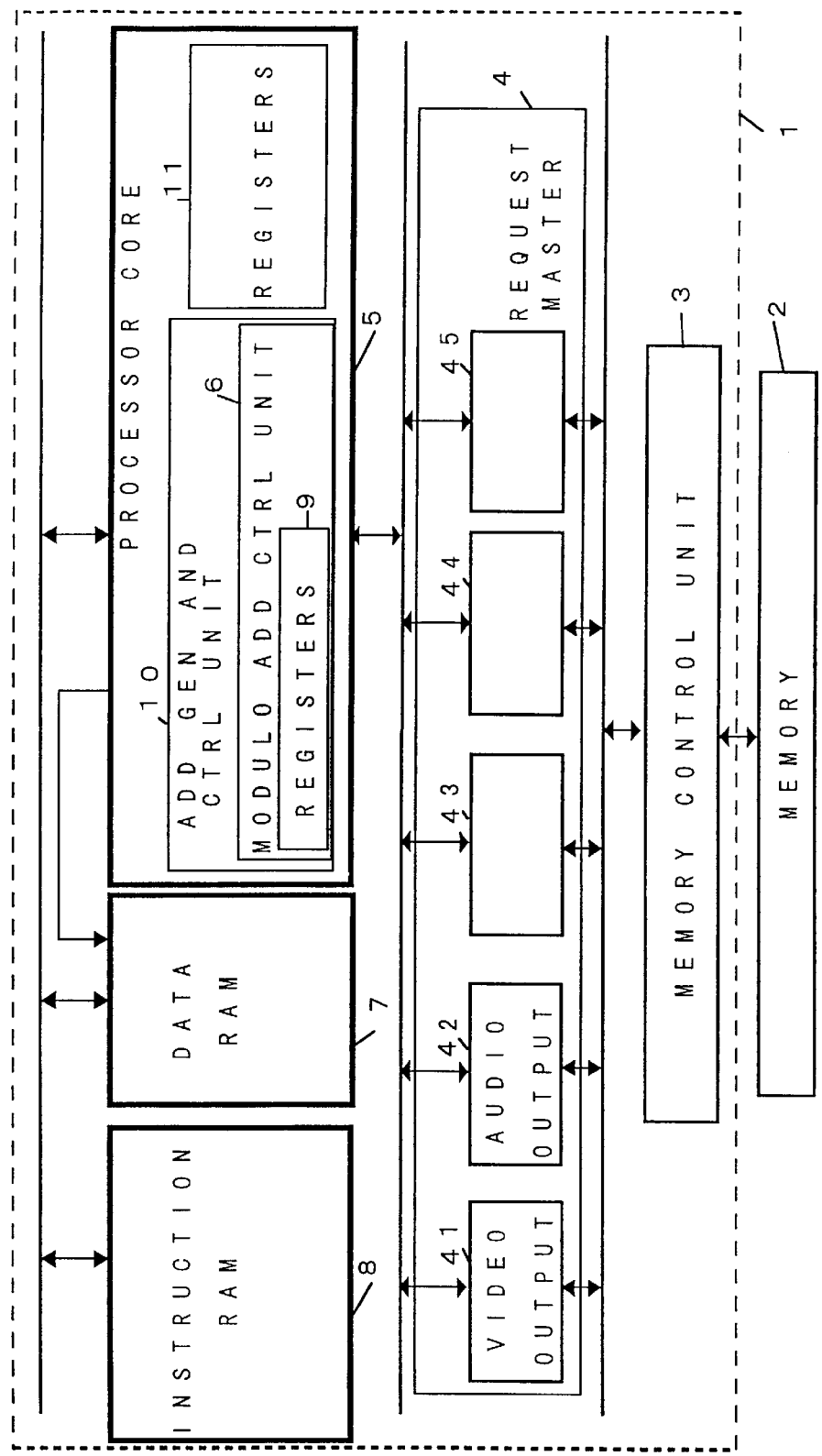
FIG. 1 illustrates a relation of processor and memory for the embodiments of the present invention.

Reference will now be made in detail to the present preferred embodiments of the invention, examples of which are illustrated in the accompanying drawings, wherein like reference numerals indicate like elements throughout the several views.

Embodiment 1

As one embodiment of the present invention, the relation of processor 1 and memory is illustrated in FIG. 1. The present embodiment is comprised of the processor 1 and the memory 2. The memory 2 is a memory where a data is placed on. The processor 1 is provided with the followings: a memory control unit 3; a request master 4; a processor core 5; a data random access memory (RAM) 7; and an instruction RAM 8. The processor core 5 includes an address generation and control unit 10. The address generation and control unit 10 includes a modulo addressing control unit 6 and registers 9 and 11.

The memory control unit 3 arbitrates an access request from the request master 4 to the memory, to arbitrate a data exchange between the processor and the memory. In this embodiment, the request master 4 is an assembly of request masters 41 to 45, which acts as the core function of data bus at the inner processor. The processor core 5 manages a control of the inner processor. The address generation and control unit 10 generates and outputs access addresses for accessing the square area. The square area is generated by using rows and columns on the memory. The modulo addressing control unit 6 allows an accessing of the specified area cyclically. The data RAM 7 is a temporary area for storing the data at the inner processor. The instruction RAM 8 is a temporary area for storing an instruction.

In the present embodiment, a memory access from the processor core 5 to the data RAM 7 will be described, which is the memory access inside the processor 1.

In this specification, the square area is the rectangular area including a perfect square.

Next, as one example of the processor adopted in embodiment 1, its architecture will be described below. In addition to a post increment and a post decrement functions of the processor of embodiment 1, there is also a square area access function which performs a modulo addressing.

Figure 2:
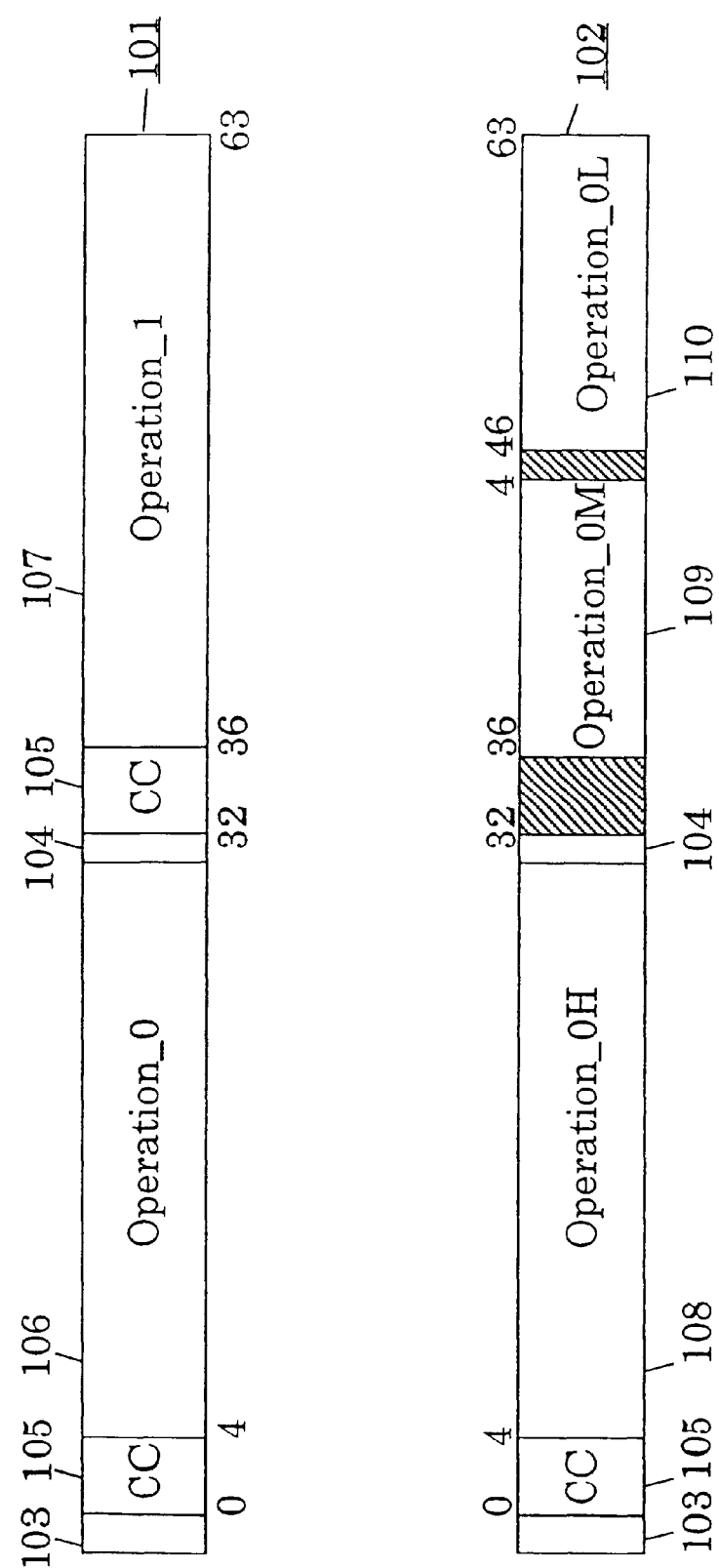
FIG. 2 illustrates instruction formats of the processor of embodiment 1 of the present invention.

FIG. 2 illustrates the instruction formats of the processor 1. The instruction formats of processor 1 include a format 101 of the instruction with two sub-instructions for instructing the two operations by using a single instruction; and a format 102 of the instruction with a single sub-instruction for instructing a single operation by using a single instruction. The format 101 of the instruction with two sub-instructions has the following fields: format fields 103 and 104; operation fields 106 and 107; and an execution condition field 105 which attaches to each one of the operation fields, one each. The format 102 of the instruction with a single sub-instruction has the following fields: the format fields 103 and 104; and operation fields 108, 109 and 110, and an execution condition field 105 which attaches to these operation fields.

FIG. 3 illustrates a detail of the format fields 103 and 104. First, values of FM code indicated in FIG. 3 will be described. Values of FM code are FM0 for the field 103 and FM1 for the field 104. FM=XY means that a value X is value of FM0 and a value Y is a value of FM1. For example, FM=10 is FM0=1 and FM1=0.

Next, a meaning of FM code is described. When FM=00, this instruction is the instruction with two sub-instruction, and an operation of Operation_0 instructed by the operation field 106 and an operation of Operation_1 instructed by the operation field 107 are executed in parallel at a clock cycle immediately after a decode. When FM=01, this instruction is the instruction with two sub-instructions, and the operation of Operation_0 instructed by the operation field 106 is executed at a clock cycle immediately after a decode. The operation of Operation_1 instructed by the operation field 107 is executed at a delay of clock cycle relative to the Operation_0. When FM=10, this instruction is the instruction with two sub-instructions, and the operation of Operation_1 instructed by the operation field 107 is executed at a clock cycle immediately after a decode. The operation of Operation_0 instructed by the operation field 106 is executed at a delay of one clock cycle relative to Operation_1. When FM=11, this is the instruction with a single sub-instruction, and the single sub-instruction by the operation fields 108, 109 and 110 are executed at a clock cycle immediately after a decode.

FIG. 4 illustrates a detail of the execution condition field 105. The execution condition field 105 depends on a value of flag F0 and a value of flag F1 of processor condition language of FIG. 8, which will be described later on. The execution condition field 105 determines whether the operation indicated in the operation fields 106 and 107 or the operation fields 108, 109 and 110 are valid or invalid. What is meant by a valid operation is that the operation result is reflected to the register, the memory, and the flag, and a defined operation result of this operation remains. What is meant by an invalid operation is that the operation result is not reflected to the register, the memory nor the flag, and a result of this operation which is NOP (no operation) remains in the register or the flag, without concerning types of the defined operations.

Hereinbelow, a value of the execution condition field 105 is expressed as CC. When CC=000, the operation is always valid, regardless of the values of F0 and F1. When CC=001, the operation is only valid if F0=true and the value of F1 is not concerned. When CC=010, the operation is only valid if F0=false and the value of F1 is not concerned. When CC=011, the operation is only valid if F1=true and the value of F0 is not concerned. When CC=100, the operation is only valid if F1=faluse and the value of F0 is not concerned. When CC=101, the operation is only valid if both F0 and F1 are true. When CC=110, the operation is only valid if F0=true and F1=false. When CC=111, an operation is undefined, and this value will not be used in instructing.

FIG. 5 illustrates a detail of short operation fields expressed in 28 bits length (106 and 107 of FIG. 2) and a detail of long operation fields expressed in 54 bits length (108, 109 and 110 of FIG. 2). The short operation fields include seven formats 111, 112, 113, 114, 115, 116 and 117. The long operation fields include two formats 118 and 119.

The format 111 includes the following: a field 120 for specifying an operation content; two fields 121 and 122 for specifying register numbers; a field 123 for specifying the register number or an immediate value of 6 bits length; and a field 124 for specifying whether the field 123 shows the register number or the immediate value. The format 111 is used for access memory operation of indirect register addressing. The format 112 includes the following: the field 120 for specifying the operation content; the fields 121 and 123 for specifying the register number; the field 123 for specifying the register number or the 6 bits length immediate value; and a field 125 for specifying whether the field 123 shows the register number or the immediate value. The format 112 is used in mathematical operation, logical operation, shift operation and bit operation. The format 113 includes the field 120 for specifying the operation content and a field 126 for specifying the register number. The format 113 is used in a branch instruction and a jump. The jump is specified by the register. The format 114 includes the field 120 for specifying the operation content, and a displacement field 127 of 18 bits length. The format 114 is used in the branch instruction and the jump. The format 115 comprises the following: the field 120 for specifying the operation content; the field 121 for specifying the register number; a field 128 for specifying the register number or an immediate value of 12 bits length; a field 129 for specifying whether the field 128 indicates the register number or the immediate value; and a field 130 for specifying whether or not the field 121 performs a condition jump or a condition branch by a zero test. The format 115 is used in the condition jump and the condition branch instruction. The format 116 includes the following: the field 120 for specifying the operation content; the field 121 for specifying the register number; the field 128 for specifying the register number or the immediate value of 12 bits length; and the field 129 for specifying whether the field 128 shows the register number or the immediate value. The format 116 is used in the condition jump, the condition branch instruction, and a repeat instruction. The format 117 includes the following: the field 120 for specifying the operation content; the field 128 for specifying the register number or the immediate value of 12 bits length; the field 129 for specifying whether the field 128 shows the register number or the immediate value; and the field 131 for specifying a delay value of a delayed instruction. The format 117 is used in a delayed jump and a delayed branch instruction. The format 118 includes the following: the field 120 for specifying the operation content; the fields 121 and 122 for specifying the register number; and a field 132 for specifying an immediate value of 32 bits length. The format 118 is used in a complex mathematical operation, a mathematical operation using a large immediate value, a memory access operation of indirect register addressing with attached large displacement and a branch operation of large branch displacement, and a jump operation to an absolute address. The format 119 includes the following: the field 120 for specifying the operation content; the fields 121 and 122 for specifying the register number; the field 132 for specifying the immediate value of 32 bits length; and a field 133 for specifying whether or not the field 132 performs the condition jump and condition branch by the zero test. The format 119 is used in the condition jump having a large branch displacement and condition branch instruction.

Figure 6A:
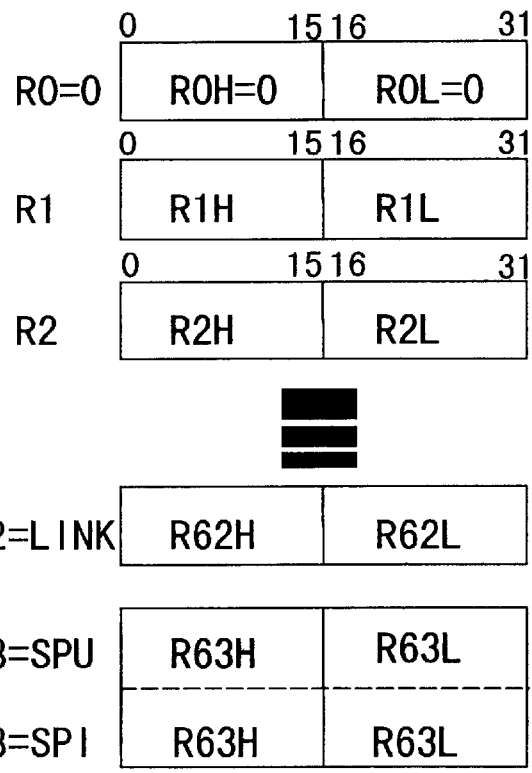
FIG. 6A illustrates configuration of general purpose registers inside a register of the processor of embodiment 1 of the present invention.
Figure 6B:
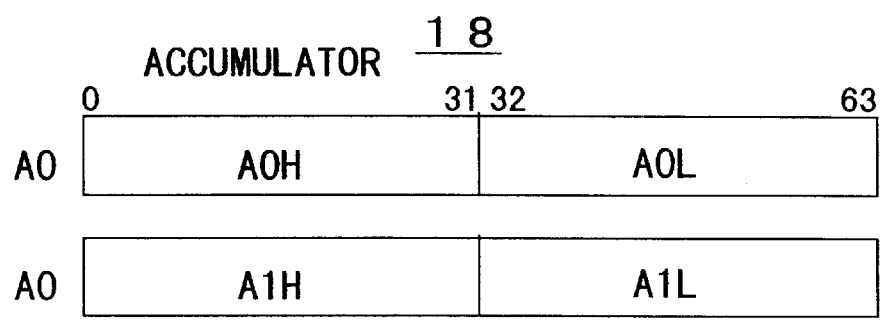
FIG. 6B illustrates configuration of accumulators inside the register of the processor of embodiment 1 of the present invention.

FIGS. 6A, 6B and 7 illustrate the configurations of registers of the processor 1. The processor 1 includes sixty-four general purpose registers 5 of 32 bits length; eighteen control registers 150; and two accumulators 18. FIG. 6A illustrates the general purpose registers 5. FIG. 6B illustrates the accumulators 18. FIG. 7 illustrates the control register 150. The general purpose register (R0) is always 0 (zero), and all writing is ignored. The general purpose register (R63) is a stack pointer, which selects a value of stack pointer interrupts (SPI) or a value of stack pointer user (SPU), depending on a SM field value of the processor condition language 10 of FIG. 8, which will be described later. After the selections are made, the general purpose register (R63) will operate. The control register 150 includes a program counter 151, the processor condition language 10, and various special registers. In the operation of format 112 of FIG. 5, 32 bits of the general purpose registers 5 are separately accessed as follows: 16 bits at an upper level; and 16 bits at a lower level. This access is possible for all sixty-four general purpose registers 53. Likewise, the two accumulators of the format 112 of FIG. 5 are separately accessed as follows: 32 bits at an upper level accumulator; and 32 bits at a lower level accumulator. This access is possible for the two accumulators 18.

FIG. 8 illustrates a detail of processor condition language 10 shown in CR1 of FIG. 7. The upper 16 bits of the processor condition language 170 includes the following: a SM field 171 for switching the stack pointer; an EA field 172 for showing a detection of software debagger trap (SDBT); a DB field 173 for specifying permission of SDBT; a DS field 174 for specifying a debag interrupt permission; an IE field 175 for specifying an interrupt permission; a RP field 176 for specifying a repeat operation permission; a MD field 177 which is a circulation mode information for specifying a modulo addressing permission; and a RMD field 178 for specifying a modulo addressing permission of the square area, or in other words, a square circulation mode information for deciding whether or not to repeatedly access the square area. The lower 16 bits is the flag field 180. There are 8 flags in flag fields 180. Among these flag fields 180, F0 flag 181 and F1 flag 182 control the valid operation or invalid operation as described in FIG. 4. The value of each flag changes depending on the results of mathematical operation or comparative operation, changes by initialization by a flag initialization operation, and also changes by writing a value to the flag field 180 by writing operation of the flag value. Also, the value of flag field 180 can be read by the flag value reading operation.

Instructions of the processor 1 are listed below.
A. MCU function instructions
A-1. Load/Store instructions
LDB: Load one byte to a register with sign extension
LDBU: Load one byte to a register with zero extension
LDH: Load one half-word to a register with sign extension
LDHH: Load one half-word to a register high with sign extension
LDHU: Load one half-word to a register with zero extension
LDW: Load one word to a register
LD2W: Load two words to registers
LD4BH: Load four bytes to four half-word in two registers with sign extension
LD4BHU: Load four bytes to four half-word in two registers with zero extension
LD2H: Load two half-word to two word in two registers with sign extension
STB: Store one byte from a register
STH: Store one half-word from a register
STHH: Store one half-word from a register high
STW: Store one word from a register
ST2W: Store two words from registers
ST4HB: Store four bytes from four half-word from two registers
ST2H: Store two half-word from two registers
MODDEC: Decrement a register value by a 5-bit immediate value
MODINC: Increment a register value by a 5-bit immediate value value
A-2. Transfer instructions
MVFSYS: Move a control register to a general purpose register
MVTSYS: Move a general purpose register to a control register
MVFACC: Move a word from an accumulator
MVTACC: Move two general purpose registers to an accumulator
A-3. Compare instructions
CMPcc: Compare
cc=EQ, NE, GT, GE, LT, LE, PS(both positive), NG(both negative)
CMPUcc: Compare unsigned
cc=GT, GE, LT, LE
A-4. Maximum/Minimum instructions reserved
A-5. Arithmetic operation instructions
ABS: Absolute
ADD: Add
ADDC: Add with carry
ADDHppp: Add half-word ppp=LLL, LLH, LHL, LHH, HLL, HLH, HHL, HHH
ADDS: Add register Rb with the sign of the third operand
ADDS2H: Add sign to two half-word ADD2H: Add two pairs of half-words
AVG: Average with rounding towards positive infinity
AVG2H: Average two pairs of half-words rounding towards positive infinity
JOINpp: Join two half-words pp=LL, LH, HL, HH
SUB: Subtract
SUBB: Subtract with borrow
SUBHppp: Subtract half-word ppp=LLL, LLH, LHL, LHH, HLL, HLH, HHL, HHH
SUB2H: Subtract two pairs of half-words
A-6. Logical operation instructions
AND: logical AND
OR: logical OR
NOT: logical NOT
XOR: logical exclusive OR
ANDFG: logical AND flags
ORFG: logical OR flags
NOTFG: logical NOT a flag
XORFG: logical exclusive OR flags
A-7. Shift operation instructions
SRA: Shift right operation
SRA2H: Shift right operation two half-words
SRC: shift right concatenated registers
SRL: Shift right logical
SRL2H: Shift right logical two half-words
ROT: Rotate right
ROT2H: Rotate right two half-words
A-8. Bit operation instructions
BCLR: Clear a bit
BNOT: Invert a bit
BSET: Set a bit
BTST: Test a bit
A-9. Branch instructions
BRA: Branch
BRATZR: Branch if zero
BRATNZ: Branch if not zero
BSR: Branch to subroutine
BSRTZR: Branch to subroutine if zero
BSRTNZ: Branch to subroutine if not zero
DBRA: Delayed Branch
DBRAI: Delayed Branch immediate value
DBSR: Delayed Branch to subroutine
DBSRI: Delayed Branch immediate value to subroutine
DJMP: Delayed Jump
DJMPI: Delayed Jump immediate value
DJSR: Delayed Jump to subroutine
DJSRI: Delayed Jump immediate value to subroutine
JMP: Jump
JMPTZR: Jump if zero
JMPTNZ: Jump if not zero
JSR: Jump to subroutine
JSRTZR: Jump to subroutine if zero
JSRTNZ: Jump to subroutine if not zero
NOP: No operation
A-10. OS-related instructions
TRAP: Trap
REIT: Return from exception, interrupts, and traps
B. DSP function instructions
B-1. Arithmetic operation instructions
MUL: Multiply
MULX: Multiply with extended precision
MULXS: Multiply and shift to the right by one with extended precision
MULX2H: Multiply two pairs of half-words with extended precision
MULHXpp: Multiply two half-words with extended precision pp=LL, LH, HL, HH
MUL2H: Multiply two pairs of half-words
MACa; Multiply and add a=0, 1
MACSa: Multiply, shift to the right by one, and add a=0, 1
MSUBa: Multiply and subtract a=0, 1
MSUBSa: Multiply, shift to the right by one, and subtract a=0, 1
SAT: Saturate
SATHH: Saturate word operand into high half-word
SATHL: Saturate word operand into low half-word
SATZ: Saturate into positive number
SATZ2H: Saturate two half-words into positive number
SAT2H: Saturate two half-word operands
B-2. Repeat instructions
REPEAT: Repeat a block of instructions
REPEATI: Repeat a block of instructions with immediate value Next, the modulo addressing used in embodiment 1 is described with reference to FIG. 9. In this embodiment, a case of the memory access from the processor core 5 to the data RAM 7 is described. Following registers are available among the registers used in the modulo addressing of FIG. 9. The registers 201, 202 and 203 are for setting the start address of the access area and the end address of the access area, and for setting an amount of data per row. The register 201 uses a control register CR9 of FIG. 7. The register 202 uses a control register CR10 of FIG. 7. The register 203 uses a control register CR11 of FIG. 7. The general purpose registers 207, 208 and 209 of the general purpose registers 204 are either one of the general purpose registers from R0 to R63 illustrated in FIG. 6A, except for those that has a pre-determined use as in R0, R62 and R63. In this embodiment, the register 207 is R4, the register 208 is R5 and the register 209 is R10. Hereinbelow, in the present embodiment, the registers R4, R5 and R10 are indicated as r4, r5 and r10, respectively.

Further, the register 205 is the MD field 177 for specifying the modulo addressing permission inside the processor condition language 10 illustrated in FIG. 8. The register 206 is the RMD field 178 for specifying the modulo addressing permission inside the square area of the processor condition language 10.

Figure 9:
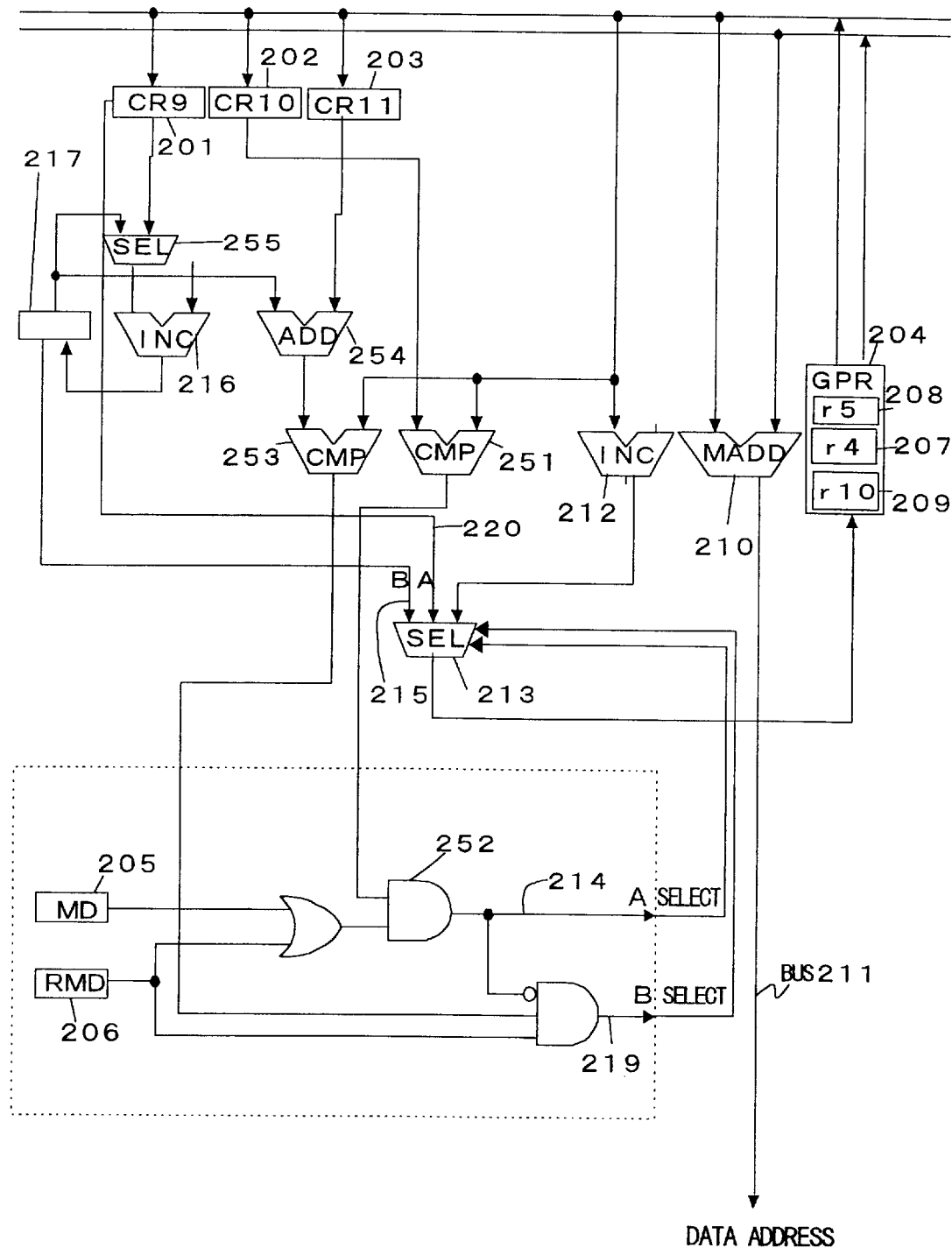
FIG. 9 illustrates a modulo addressing operation of the embodiment 1 of the present invention.

Abbreviations in FIG. 9 are as follows: a comparator CMP; a selector SEL; an adder ADD; an adder which adds a pre-determined value INC; and a modulo adder MADD.

Figure 10:
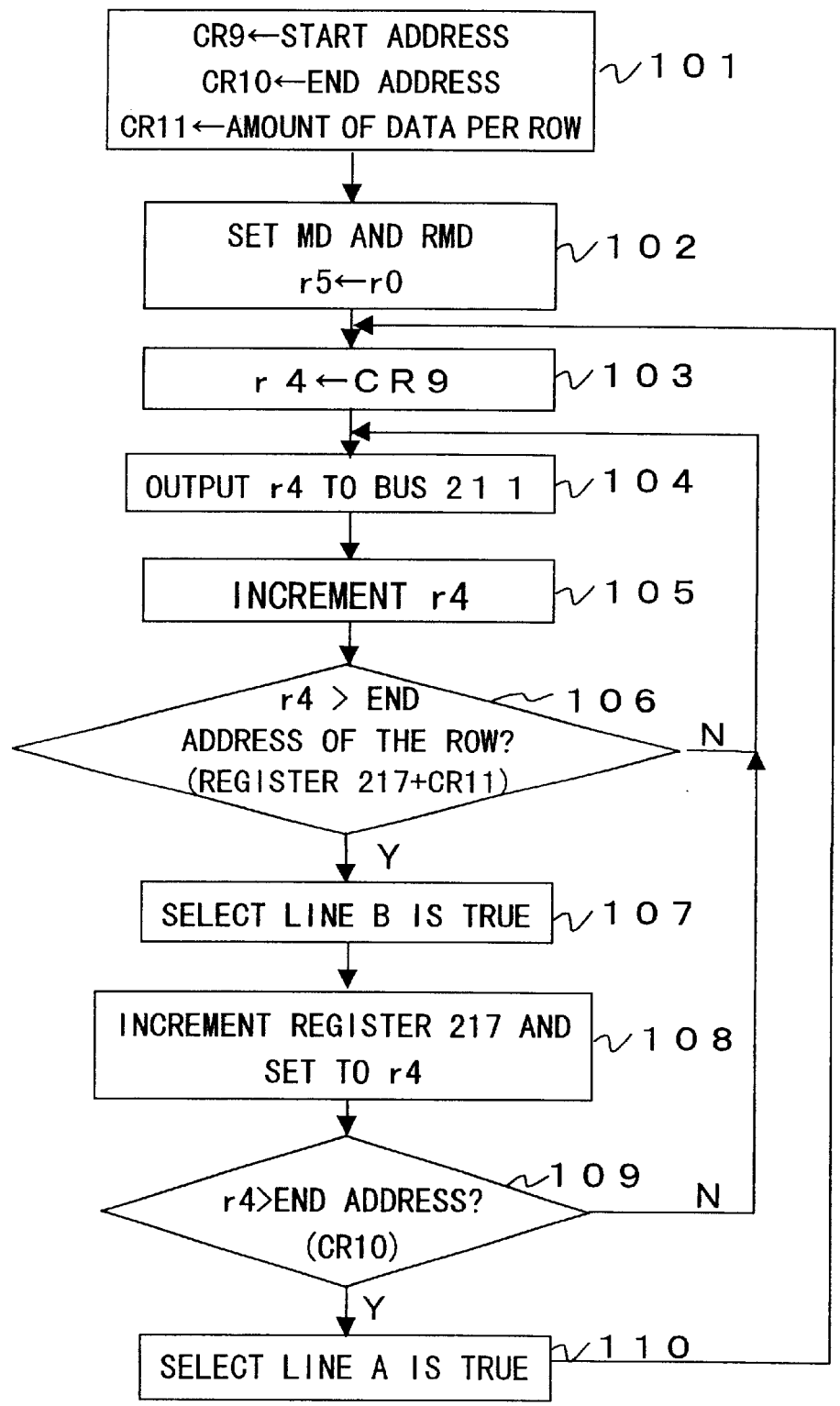
FIG. 10 is a flow chart illustrating an operation procedure of access address generation of embodiment 1 of the present invention.

Operation of the modulo addressing is described next with reference to the drawings of FIGS. 9 and 10. First, the processor core 5 sets the start address of the access area, the end address of the access area, and the amount of data per row to the registers 201, 202 and 203, which are previously set at the general purpose registers 204 (see step S101 of FIG. 10). The general purpose registers 204 of FIG. 9 does not illustrates a general purpose register which stores the values set to the registers 201, 202 and 203.

Next, the registers 205 and 206 are set. Also, a value of general purpose register R0 is set to the general purpose register r5 (see step S102 of FIG. 10). In this embodiment, r5 uses zero which is a value of R0. Further, a value of CR9, that is, the start address is set to r4 (see step S103 of FIG. 10).

In the present embodiment, the case of executing a modulo addressing processing using a series of instructions as stated below is described. The instructions stated below are for a repetition processing from a line labeled LOOP (1) to a final line (3).

LOOP:  (1)

LD2W r10, r4+, r5  (2)

⋮

BRA LOOP  (3)

First, in line (2), values of r4 and r5 are added by the modulo adder 210, and an added result is output to the data RAM 7 of FIG. 1 through a bus 211. On the other hand, the value of r4 is incremented depending on a size of data transfer at a modulo addressing incrementer 212 (hereinbelow referred to as INC212).

That is, the following operations are performed:
(i) reading data from a position specified by r4+r5 (see step S104 of FIG. 10); and
(ii) incrementing the value of r4 by a pre-determined value (see step S105 of FIG. 10).

The steps described in (i) and (ii) are repeated for accessing the specified area.

Next, an operation of repeatedly accessing the specified area is described. First, a procedure for repeatedly accessing the specified area of the memory access that is not square, and that is specified from a normal modulo addressing operation is shown.

Until reaching the end address of the specified area, the SEL 213 selects an incremented value of single data transfer size to r4 at the INC212. A selected value at the SEL213 is used upon executing a next LD2W instruction by rewinding to the r4.

Parallel to the operation stated above, the value of r4 is detected whether or not it has reached the end address. In concrete terms, in CMP251, the value of r4 and the value of register 202 (end address) are compared. As a result of this comparison, if the value of r4 is found to be greater than the end address, and in addition, if the MD value of register 205 is valid, a select line 214 is true by a logical product 252. Accordingly, a value set at the register 201, that is, the value of start address is selected at SEL 213. The value selected at SEL 213 is set to the r4, and output to the data RAM 7 through the bus 211. Consequently, the memory area specified by the start address which is a value of register 201 and the end address which is a value of register 202 can cyclically be used.

Next, a case of memory accessing the square area cyclically is described.

The amount of data per row which is set at the register 203 is used. In CMP 253, an added value of the value of register 203 and the value of address register 217 selected at SEL 255 is compared with the value of r4 (see step S106 of FIG. 10). When the value of r4 is greater than the value of end address of that row, in addition, if the RMD value of the register 206 is valid, and if further, the value of r4 is below the end address in the square area at the CMP 251, then a select line 219 is true. Accordingly, a value 215 is selected at the SEL 213. The value selected at SEL 213 is set to r4 and output to the data RAM 7 through the bus 211 (see step S108 of FIG. 10). An address register 217 increments and stores the value of register 201 at a row direction incrementer 216. The value of 215 is an output value of the address register 217. In concrete terms, the value 215 is either one of the start addresses from the first row to the last row. Accordingly, an end address is detected for each row.

Also, when the value of r4 is greater than the value of end address of the square area at CMP 251 (step S109 of FIG. 10), and in addition, if the RMD value of register 206 is valid (step S110 of FIG. 10), then the SEL 213 selects a value 220 set to the register 201, that is, the start address of the square area is selected. Accordingly, the end address of the square area of memory is detected, and the square area is cyclically used.

Figure 11:
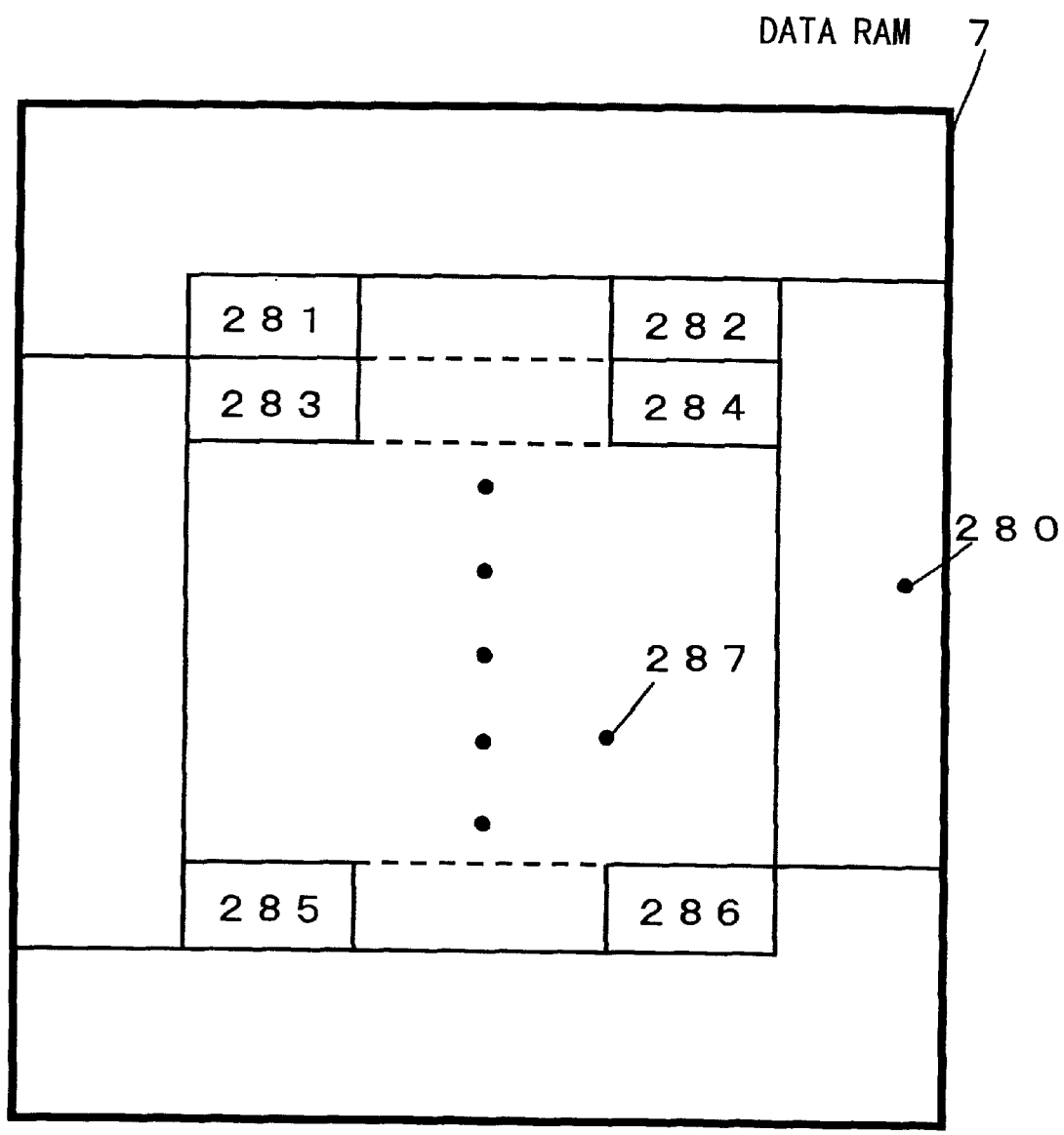
FIG. 11 illustrates a memory area when using a conventional modulo addressing and a modulo addressing of embodiment 1 of the present invention.

The memory area is described in the drawing of FIG. 11. In the normal modulo addressing, a stair-like memory area 280 indicated by the start address 281 and the end address 286 inside the data RAM 7 is cyclically being used. However, in the square modulo addressing of the present embodiment, a square area 287 surrounded by 281, 282, 285 and 286 are cyclically used, and this allows an efficient use of the memory.

The processor described with reference to FIGS. 2 and 8 of embodiment 1 is only one example of a processor for implementing the present invention, and there are other processors which can be adopted as long as they can implement the present invention. Also, the address generating method of FIG. 9 can be implemented using an alternate method.

The MD field for specifying the modulo addressing permission is illustrated in FIG. 9 for a purpose of describing the normal modulo addressing, however, for implementing the present invention, the RMD field which specifies the permission of square area modulo addressing only is sufficient for this purpose.

Accordingly, the processor illustrated in this embodiment can supply an access apparatus and a method to efficiently use the square area, without making the addressing mode complex.

As described above, the processor of the present invention connects to the memory, installs the memory control unit for controlling the access processing to the memory, and installs the request master for outputting the access request via the memory control unit and to the memory. The memory control unit is provided with a register for storing the start address of a continuous area, a register for storing the end address of the continuous area, and a register for storing the amount of data per row. The memory control unit further is provided with the circulation mode information for cyclically accessing the continuous area, and the square circulation mode information for cyclically accessing the square area. When the circulation mode information is valid, the continuous area can cyclically be accessed by the memory control unit using the register storing the start address and the register storing the end address. When the square circulation mode information is valid, the memory control unit installs the modulo addressing control unit having a control function is cyclically accessing the square area using the start address register, the end address register and the column size register.

Embodiment 2.

The embodiment 2 describes a case of memory accessing from a processor 1a to the memory 2 situated outside.

Figure 12:
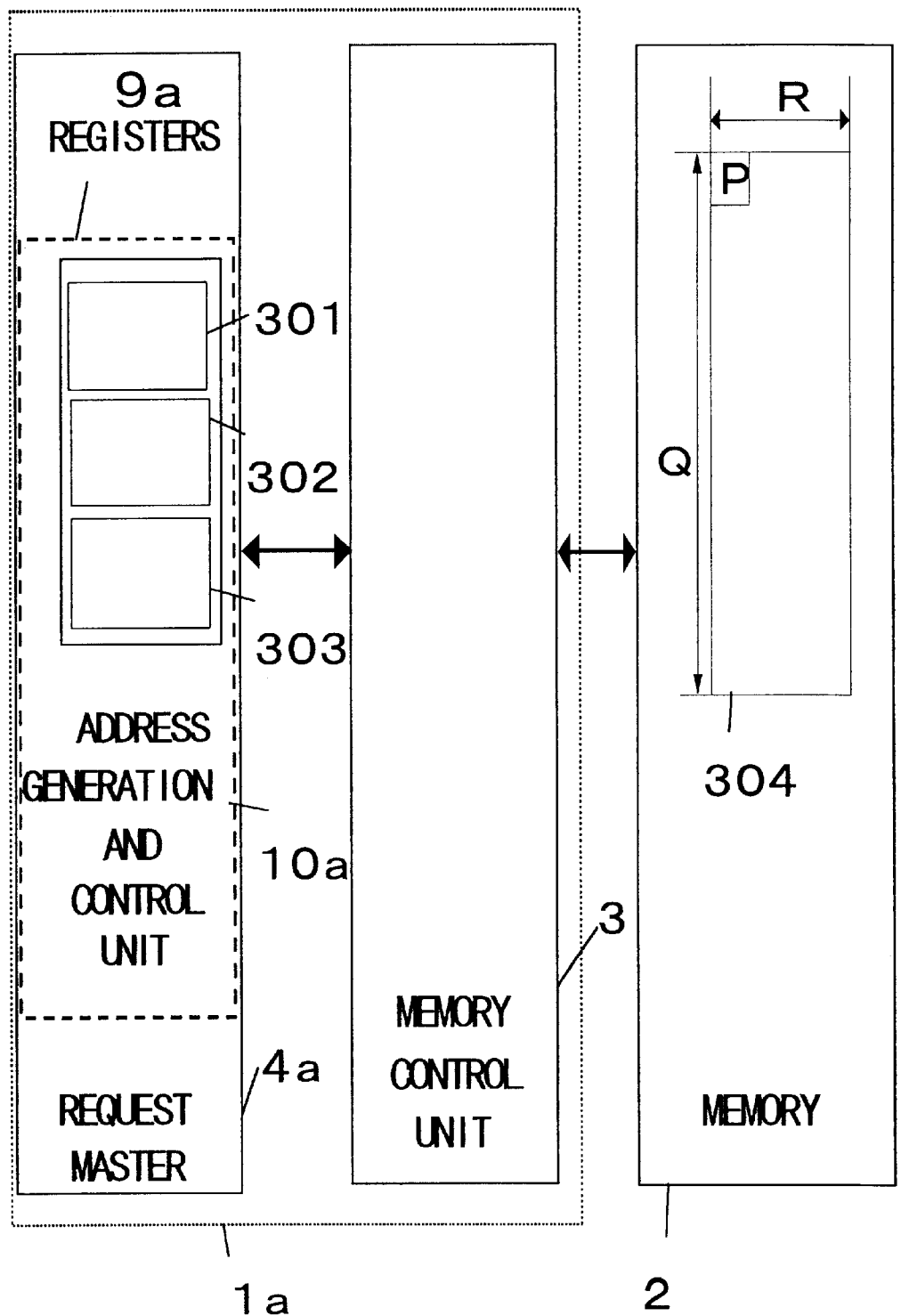
FIG. 12 illustrates a relation of processor and memory of embodiment 2 of the present invention.

FIG. 12 is a simplified version of the configuration of FIG. 1, illustrating a relation of processor and memory of embodiment 2 of the present invention. FIG. 12 comprises the processor 1a and the memory 2.

The memory 2 is a memory where a data is placed on. The processor 1a comprises a memory control unit 3 and a request master 4a. Also, the request master 4a includes registers 9a and an address generation and control unit 10a.

The memory control unit 3 arbitrates an access request to the memory 2, outputs the access request from the request master 4a, in order to arbitrate a data exchange between the processor 1a and the memory 2. The request master 4a performs the core function of data bus inside the processor. The address generation and control unit 10a generates and outputs the access addresses for accessing the square area. The square area is generated by using the rows and columns on the memory.

The registers 301, 302 and 303 are for specifying a square area. The register 301 is a start address (P) of the square area. The register 302 is a number of rows (Q) of the square area. The register 303 is an amount of data per row (R) of the square area. The register 304 shown in the memory 2 is the square area specified by the registers 9a.

A memory access operation of embodiment 2 is described with reference to the drawing of FIG. 12.

First, the request master 4a outputs the access request to the memory 2 through the memory control unit 3. Normally, the access requests are output from a plurality of the request masters, therefore, the memory control unit 3 arbitrates these access requests, and gives access permission to one of the access requests. Next, the request master 4a generates the access addresses for the memory 2, and outputs the access addresses to the memory control unit 3. The data is exchanged between the request master 4a and the memory 2 via the memory control unit 3. When accessed to the end address of the square area 304, the access of the request master 4a completes. The end address of the square area 304 are specified at the registers 301, 302 and 303.

Outline of the memory access operation is described above.

Figure 13:
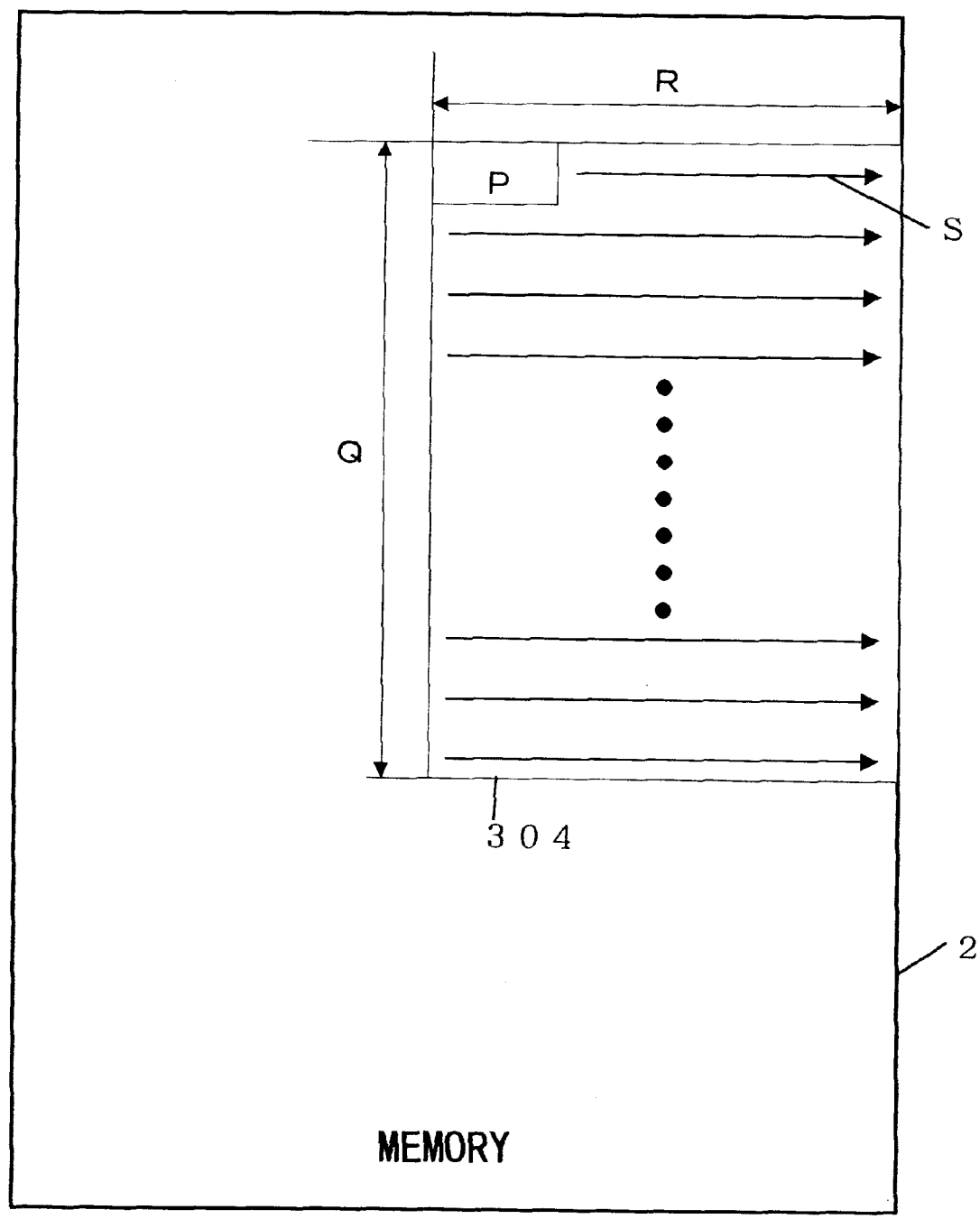
FIG. 13 illustrates a memory area of embodiment 2 of the present invention.

The memory area of embodiment 2 is described with reference to FIG. 13. The square area 304 on the memory 2 is specified by the registers 301, 302 and 303. An output order of address for accessing generated at the request master 4a is in a direction of an arrow S from the start address P. Using this output order, outputs is performed by an amount of rows set by the register 302.

Next, a process of generating the access addresses is described with reference to FIG. 14. According to a flow of the process of generating the access addresses of the present embodiment, the access address is generated, set the generated access addresses to the output address register 305, and outputs a value of the output address register 305 to the memory control unit 3.

First, the start address of the square area 304 set at the register 301 is set to the output address register 305, and the output address register 305 outputs the start address. Then, a next accessing address is generated at a column direction address incrementer 306 by adding an amount of single data transfer to the value of previous access address, and an added value is set to the output address register 305. A same operation is repeated down to the last row.

Decision as to whether or not the operation has reached the end address of a row is described next. The end address of row is calculated using the values set in the registers 301 and 303. The end address of row is set to a register 307. At CMP 312, if the value of register 307 exceeds a result of the column direction address incrementer 306, then the next accessing address is the start address of a next row. The start address of the next row is generated by a row direction address incrementer 308 and a value set in the register 301. Accordingly, the start address of the next row is set to the output address register 305. Hereinbelow, accessing operations to the column direction and to the row direction are repeated. In CMP 311, if a selected value at SEL309 is greater than the register 310, then an end signal is generated to complete the memory access as well as to complete the generation of the access address.

A flow of the process of generating the access addresses as mentioned above is described using FIG. 15. In step S141, set the address which is set at the register 301 to the output address register 305, and in step S142 output the start address for accessing to the memory control unit 3. Instep S143, the column direction increment is performed (see 306). In step S144, a result of the step S143 is calculated by the register 301 and the register 303, and determine whether or not the result of step S143 exceeded the end address of the row (the value set in register 307). If the result of step S143 did not exceed the value set in the register 307, then in step S147 a next access address is set at the output address register 305, and the process returns to the step S142. If the result of step S143 is exceeding the value set in the register 307, then advance to step S145 and set the start address of a next row to the output address register 305.

Step S146 determines whether or not the last row is exceeded. The last row is calculated by the register 301 and the register 302. If the result of step S146 is not exceeding the last row, then the process returns to the step S142 and output the output address register 305 to the memory control unit 3. If the result of step S146 is exceeding the last row, the memory access completes.

As a method to specify the square area as described previously, the start address, the amount of data per row, and the number of rows in the square area are being adopted, however, there are alternate ways to specify the square area, and even by using these alternate ways, no doubt that a similar function can be achieved as using the method described previously.

Figure 14:
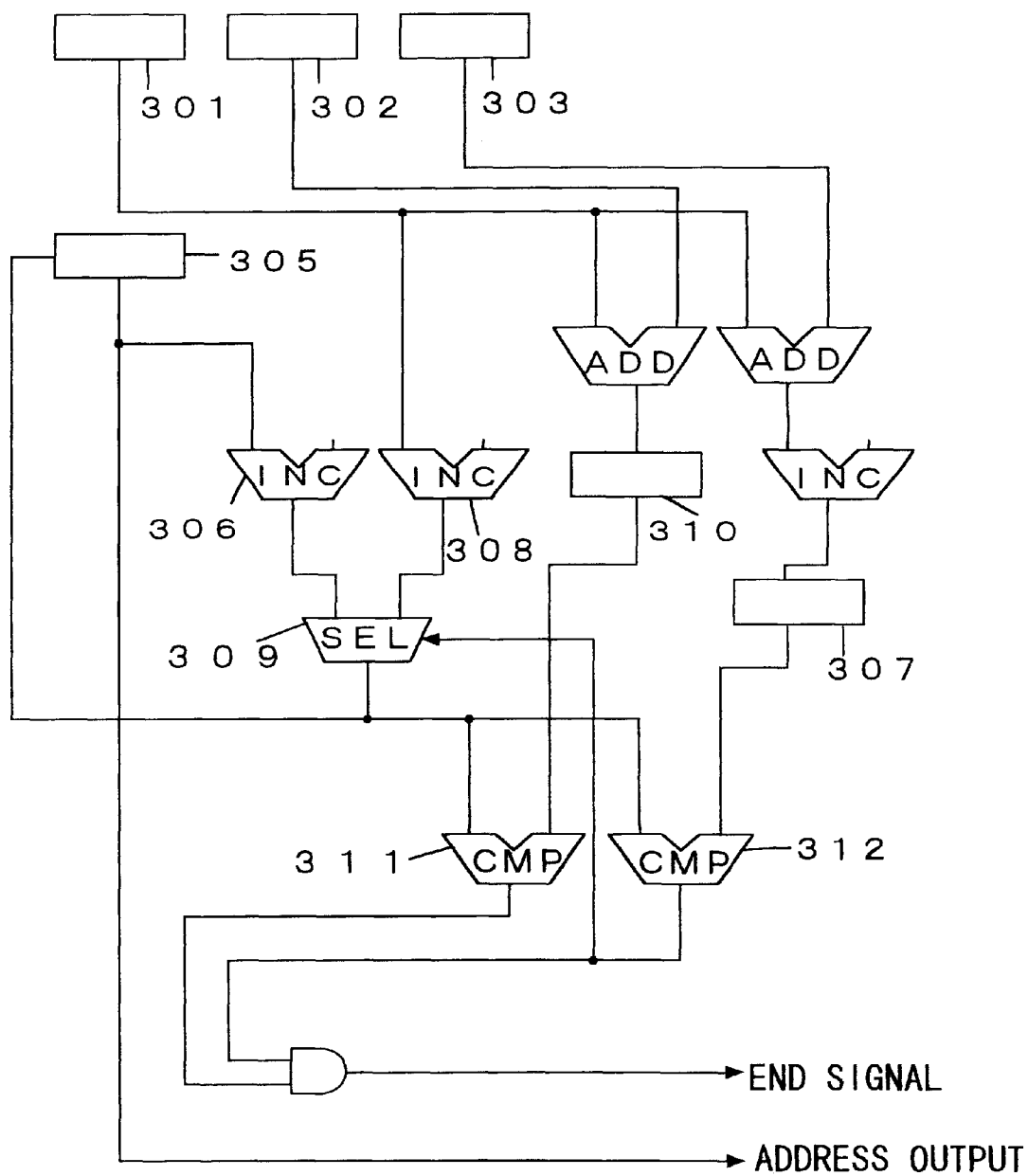
FIG. 14 illustrates one example of the access address generation of embodiment 2 of the present invention.

FIG. 14 illustrates and describes one example of generating the access address. Other method may be applied as long as it satisfy the system as described in FIG. 15.

Figure 15:
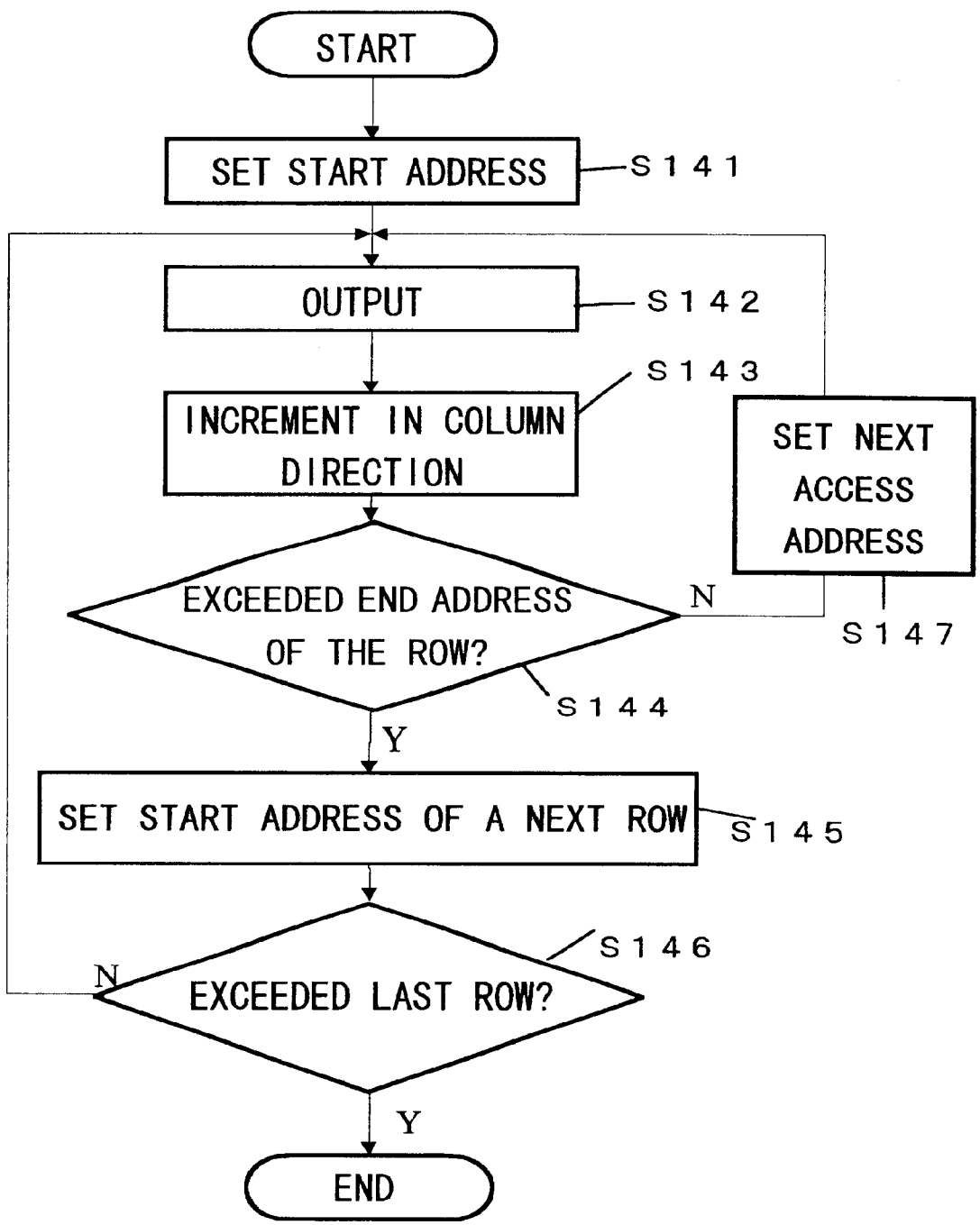
FIG. 15 is a flow chart illustrating the operation procedure of the access address generation of embodiment 2 of the present invention.
Figure 16:
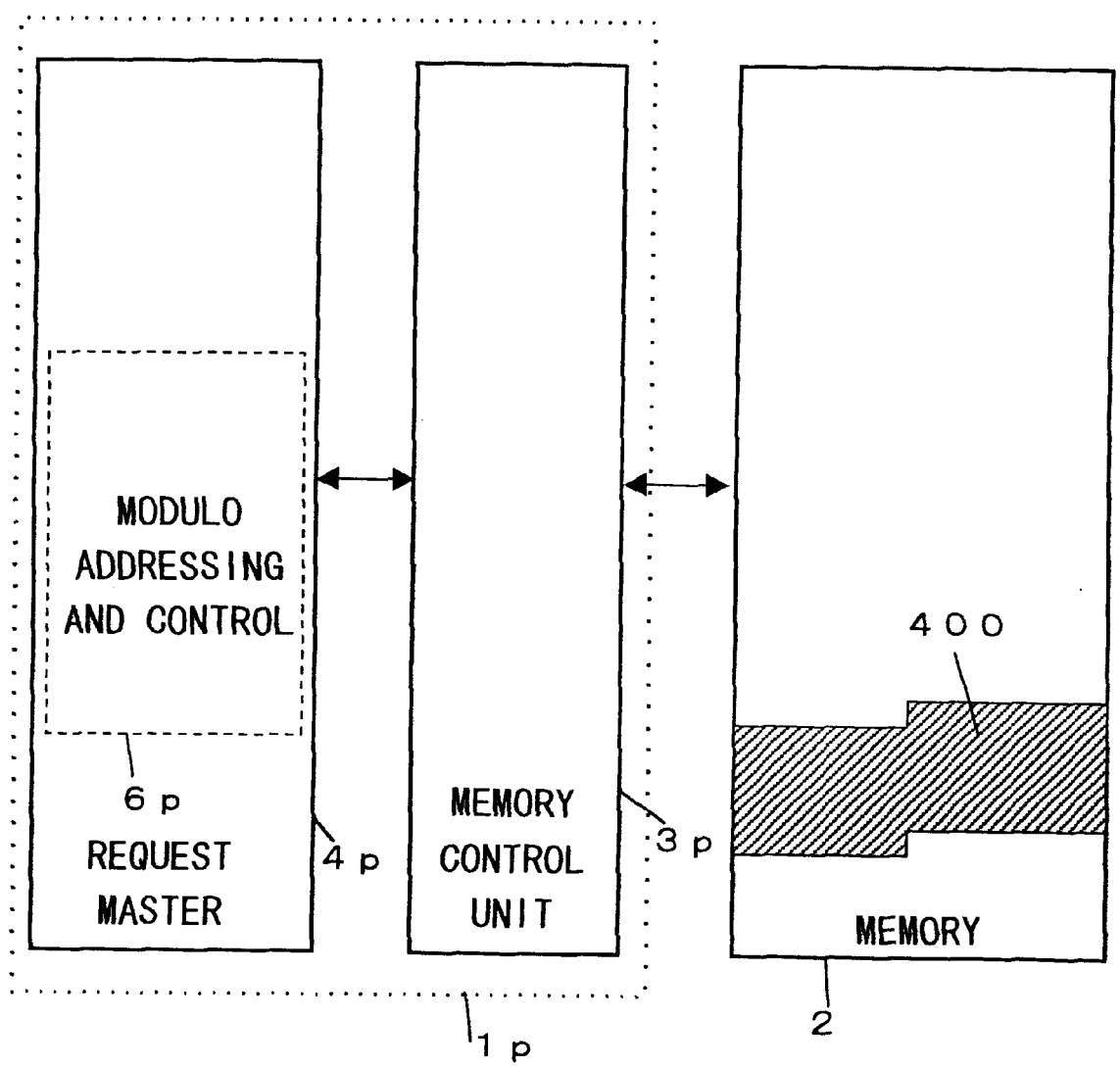
FIG. 16 illustrates a relation of processor and memory installing the conventional modulo addressing operation.
Figure 17:
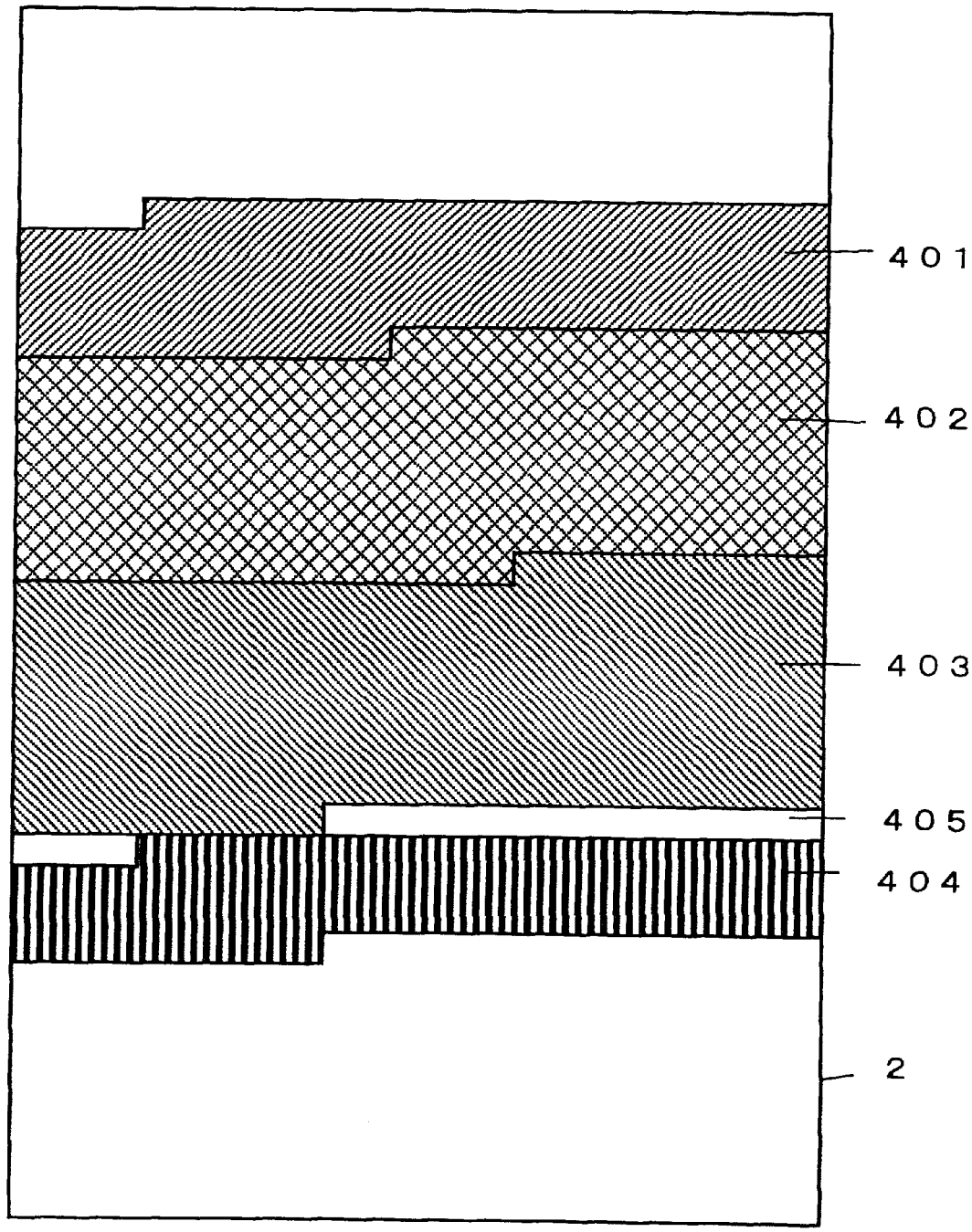
FIG. 17 illustrates the conventional memory area accessing method.
Figure 18:
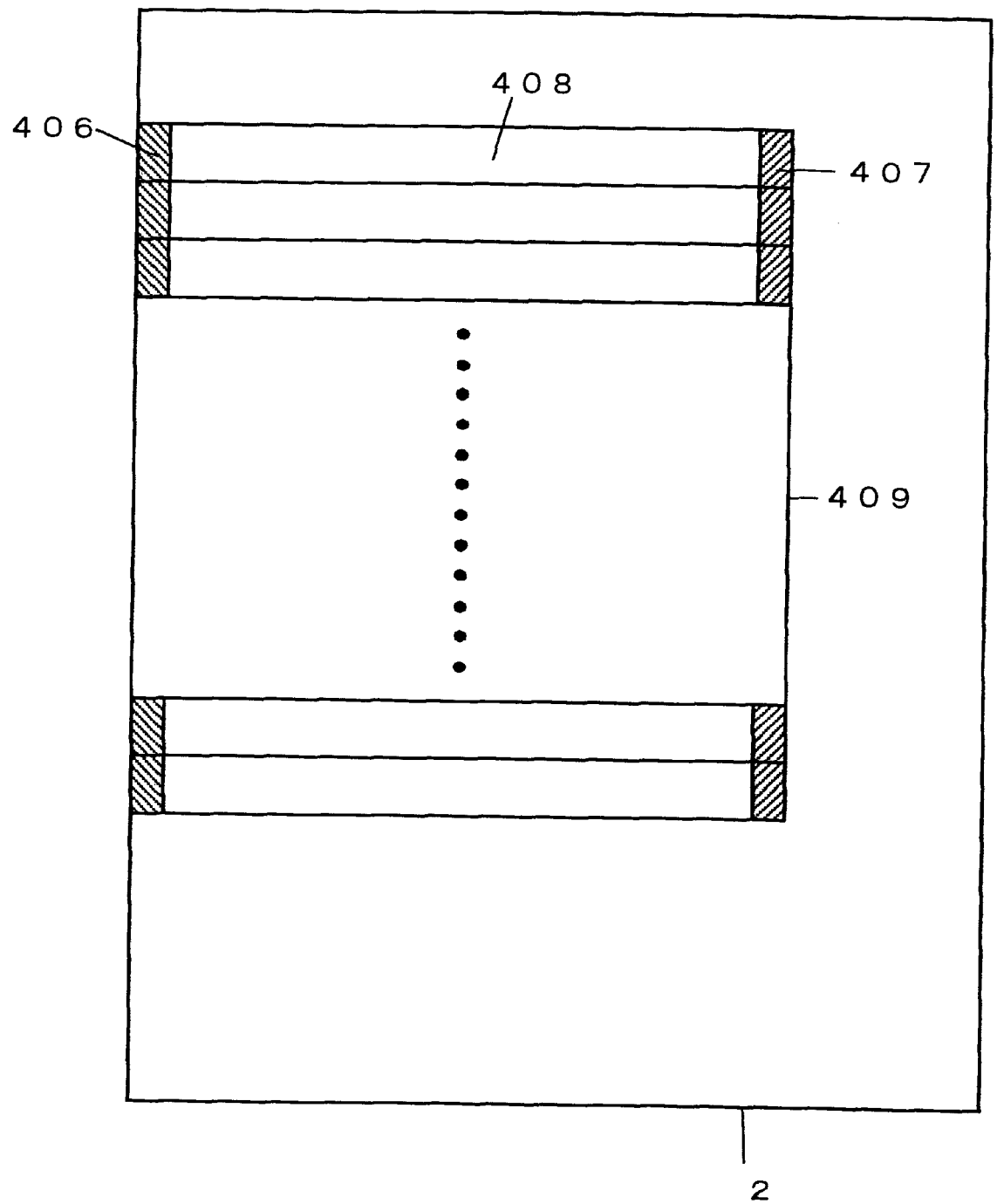
FIG. 18 illustrates a case of controlling the square area using the conventional memory specifying method.

Also, for FIG. 15, step S147 can be implemented in step S143. Specifically, in the step S143, a procedure of the column direction incrementing can be included in step S147, as well as a procedure of setting the result of incrementing to the output address register 305.

As described above, the processor of the present embodiment installs the memory control unit for controlling the memory access processing by connecting to a memory. The processor installs the request masters for outputting the access request to the memory through the memory control unit. Inside the request master, the registers are installed for regulating a square area inside the memory. The memory control unit can access the square area as the continuous area by using the register, as the same time, has a control function to output the address for accessing the start address from the end address of the square area as a continuous area to the memory control unit.

Embodiment 3.

The embodiment 1 has described the case of accessing from the processor core 5 to the data RAM7, however, in the present embodiment, a case of accessing from the processor core 5 to the memory 2 situated outside is described with reference to the drawing of FIG. 1.

The present embodiment describes a case when the processor core 5 corresponds to one of the request masters of the embodiment 2.

The generation of access address of the processor core 5 is performed similarly as to the case of embodiment 1. Accordingly, in FIG. 9, by setting the memory 2 as an output destination of the address generated, the processor of this embodiment is implemented.

According to the present invention, without making the address control more complex, the memory can be used effectively by accessing the square area of the memory.

Also, according to the present invention, by specifying the start address of the square area by specifying the end address of the square area, and by specifying the amount of data per row in the square area, the square area can be accessed using a limited number of the registers.

Furthermore, according to the present invention, by specifying the start address of the square area, by specifying the amount of data per row of the square area, and by specifying the number of rows of the square area, the square area can be accessed with a limited number of the registers.

Furthermore, according to the present invention, the square area can cyclically be accessed.

Furthermore, according to the present invention, by using the square circulation mode information, able to determine whether or not the square area is to be repeatedly accessed, and modify the square circulation mode information accordingly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A processor coupled to a memory unit having a two-dimensional memory having rows and columns, the processor comprising:

registers for storing access addresses on the memory; and an address generation and control unit for generating and outputting the access addresses for accessing a rectangular area formed by rows and columns on the memory, by using the access addresses stored in the registers;

wherein the registers include at least a register for storing a start address of the rectangular area, an end address of the rectangular area, an amount of data per row of the rectangular area, and rectangular circulation mode information;

wherein the address generation and control unit generates the access addresses for accessing the rectangular area specified by the start address of the rectangular area, the end address of the rectangular area, and the amount of data per row of the rectangular area; and wherein the address generation and control unit designates the start address of the rectangular area as a next access address in case that the value of the rectangular circulation mode information indicates to access the rectangular area cyclically, and in case that the generated access address exceeds the end address of the rectangular area.

2. The processor according to claim 1, wherein the address generation and control unit generates a next access address by adding an amount of single data transfer to the start address of the rectangular area; compares a generated access address with an end column address of a currently accessing row which is generated from the amount of data per row of the rectangular area; generates a start address of a next row when the generated access address has exceeded the end column address of the currently accessing row; accesses the rectangular area by adding the amount of single data transfer to the start address of the next row, and by repeatedly further generating the access addresses for generating the next access addresses; and detects a completion of a rectangular area accessing when the generated access address exceeds the end address of the rectangular area.

3. A processor coupled to a memory unit having a two-dimensional memory having rows and columns, the processor comprising:

registers for storing access addresses on the memory; and an address generation and control unit for generating and outputting the access addresses for accessing a rectangular area formed by rows and columns on the memory, by using the access addresses stored in the registers;

wherein the registers include at least a register for storing a start address of the rectangular area, an amount of data per row of the rectangular area, a number of rows of the rectangular area, and rectangular circulation mode information;

wherein the address generation and control unit generates the access addresses for accessing the rectangular area specified by the start address of the rectangular area, the amount of data per row of the rectangular area, and the number of rows of the rectangular areas;

wherein the address generation and control unit designates the start address of the rectangular area as a next access address in case that the value of the rectangular circulation mode information indicates to access the rectangular area cyclically, and in case that the generated access address exceeds the number of rows of the rectangular area.

4. The processor according to claim 3, wherein the address generation and control unit generates a next access address by adding the amount of single data transfer to the start address of the rectangular area; compares a generated access address with an end column address of a currently accessing row which is generated from the amount of data per row of the rectangular area and the start address of the rectangular area; generates a start address of a next row when the generated access address has exceeded the end column address of the currently accessing row; accesses the rectangular area by adding the amount of single data transfer to the start address of the next row, and by repeatedly generating the next access addresses; and detects a completion of a rectangular area accessing when the generated access address exceeds the number of rows of the rectangular area.

5. A processor coupled to a memory unit having a two-dimensional memory having rows and columns, the processor comprising:

registers for storing access addresses on the memory; and an address generation and control unit for generating and outputting the access addresses for accessing a rectangular area formed by rows and columns on the memory, by using the access addresses stored in the registers;

wherein the address generation and control unit includes a modulo addressing control unit for generating the access addresses to access the rectangular area cyclically.

6. The processor according to claim 5, wherein the registers store a rectangular circulation mode information used for deciding whether or not to access the rectangular area cyclically;

wherein the modulo addressing control unit decides whether or not to access the rectangular area cyclically by relying on a value of the rectangular circulation mode information.

7. The processor according to claim 6, wherein the modulo addressing control unit specifies a next access address to the start address of the rectangular area in case that the value of the rectangular circulation mode information indicates to access the rectangular area cyclically, and in case that the generated access address exceeded the end address of the rectangular area.

8. A memory control method for accessing a memory unit having a two-dimensional memory having rows and columns, the memory control method comprising the following steps of:

storing the access addresses of the memory;

generating and outputting the access addresses for accessing the rectangular area formed by rows and columns on the memory by using the access addresses stored in the storing step; and controlling a memory access request to the access address generated by the generating and outputting step;

wherein the storing step stores at least a start address of the rectangular area, an end address of the rectangular area, an amount of data per row of the rectangular area, and rectangular circulation mode information;

wherein the address generating and outputting step generates the access addresses for accessing the rectangular area specified by a start address of the rectangular area, an end address of the rectangular area, and an amount of data per row of the rectangular area; and wherein the start address of the rectangular area is designated as a next access address in case that the value of the rectangular circulation mode information indicates to access the rectangular area cyclically, and in case that the generated access address exceeded the end address of the rectangular area.

9. A memory control method for accessing a memory unit having a two-dimensional memory having rows and columns, the memory control method comprising the following steps of:

storing the access addresses of the memory;

generating and outputting the access addresses for accessing the rectangular area formed by rows and columns on the memory by using the access addresses stored in the storing step; and controlling a memory access request to the access address generated by the generating and outputting step;

wherein the storing step includes storing at least a start address of the rectangular area, an amount of data per row of the rectangular area, a number of rows of the rectangular area, and rectangular circulation mode information;

wherein the address generating and outputting step generates the access addresses for accessing the rectangular area specified by the start address of the rectangular area, the amount of data per row of the rectangular area, and the number of rows of the rectangular area; and wherein the start address of the rectangular area is designated as a next access address in case that the value of the rectangular circulation mode information indicates to access the rectangular area cyclically, and in case that the generated access address exceeded the last row of the rectangular area.

10. A memory control method for accessing a memory unit having a two-dimensional memory having rows and columns, the memory control method comprising the following steps of:

storing the access addresses of the memory;

generating and outputting the access addresses for accessing the rectangular area formed by rows and columns on the memory by using the access addresses stored in the storing step; and controlling a memory access request to the access address generated by the generating and outputting step wherein modulo addressing control is executed by the generating and outputting step and the controlling step for generating the access addresses to access the rectangular area cyclically.

11. A processor coupled to a memory unit having a two-dimensional memory having rows and columns, comprising:

an address generation and control unit for generating and outputting access address for accessing a rectangular area formed by rows and columns on the memory, said rectangular area defined at least in part according to stored data including at least a start address and an amount of data per row, wherein the start address is designated as a next access address in case that a stored rectangular circulation mode value indicates to access the rectangular area cyclically, and in case that the entire rectangular area has already been accessed.

12. The processor according to claim 11, wherein the address generation and control unit generates a next access address by adding the amount of single data transfer to the start address of the rectangular area; compares a generated access address with an end column address of a currently accessing row which is generated from the amount of data per row of the rectangular area and the start address of the rectangular area; generates a start address of a next row when the generated access address has exceeded the end column address of the currently accessing row; accesses the rectangular area by adding the amount of single data transfer to the start address of the next row, and by repeatedly generating the next access addresses; and detects a completion of a rectangular area accessing when the generated access address exceeds one of a stored end address or a stored number of rows of the rectangular area.

13. A memory control method for accessing a memory unit having a two-dimensional memory having rows and columns, comprising:

generating and outputting access address for accessing a rectangular area formed by rows and columns on the memory, said rectangular area defined at least in part according to stored data including at least a start address and an amount of data per row, wherein the start address is designated as a next access address in case that a stored rectangular circulation mode value indicates to access the rectangular area cyclically, and in case that the entire rectangular area has already been accessed.

14. The method according to claim 13, wherein the address generation and outputting step generates a next access address by adding the amount of single data transfer to the start address of the rectangular area; compares a generated access address with an end column address of a currently accessing row which is generated from the amount of data per row of the rectangular area and the start address of the rectangular area; generates a start address of a next row when the generated access address has exceeded the end column address of the currently accessing row; accesses the rectangular area by adding the amount of single data transfer to the start address of the next row, and by repeatedly generating the next access addresses; and detects a completion of a rectangular area accessing when the generated access address exceeds one of a stored end address or a stored number of rows of the rectangular area.

* * * * *